United States Patent [19]
Kiest, Jr.

[11] Patent Number: 5,950,682
[45] Date of Patent: Sep. 14, 1999

[54] APPARATUS AND METHOD FOR REPAIRING THE JUNCTION OF A SEWER MAIN LINE AND LATERAL

[75] Inventor: Larry W. Kiest, Jr., Ottawa, Ill.

[73] Assignee: LMK Enterprises, Inc., Ottawa, Ill.

[21] Appl. No.: 08/927,220

[22] Filed: Sep. 10, 1997

Related U.S. Application Data

[63] Continuation-in-part of application No. 08/622,817, Mar. 27, 1996, Pat. No. 5,765,597, which is a continuation-in-part of application No. 08/293,697, Aug. 19, 1994, abandoned.

[51] Int. Cl.⁶ .................... F16L 55/16; B29C 63/36
[52] U.S. Cl. .................... 138/98; 138/97; 264/269; 264/516; 156/287
[58] Field of Search ............ 138/98, 97; 264/269, 264/267, 516; 156/94, 287, 294, 574

[56] References Cited

U.S. PATENT DOCUMENTS

| | | | |
|---|---|---|---|
| 2,794,758 | 6/1957 | Harper et al. | 156/286 |
| 3,230,129 | 1/1966 | Kelly | 156/287 |
| 3,494,813 | 2/1970 | Lawrence et al. | 138/141 X |
| 3,560,295 | 2/1971 | Kimbrell et al. | 156/287 |
| 3,914,825 | 10/1975 | Reynolds | 24/115 R |
| 3,976,578 | 8/1976 | Beane | 210/484 |
| 4,009,063 | 2/1977 | Wood | 156/71 |
| 4,064,211 | 12/1977 | Wood | 264/516 |
| 4,135,958 | 1/1979 | Wood | 156/199 |
| 4,167,358 | 9/1979 | Besha | 405/87 |

(List continued on next page.)

FOREIGN PATENT DOCUMENTS

| | | |
|---|---|---|
| 1194264 | 1/1985 | Canada . |
| 241719 | 10/1987 | European Pat. Off. . |
| 518521 | 12/1992 | European Pat. Off. . |
| 518521A2 | 12/1992 | European Pat. Off. . |
| 3929558 | 3/1991 | Germany . |
| 4031949 | 4/1992 | Germany . |
| 5534969 | 3/1980 | Japan . |
| 5549225 | 4/1980 | Japan . |
| 618503 | 8/1978 | U.S.S.R. . |
| 1553408 | 9/1979 | United Kingdom . |
| 2018384 | 10/1979 | United Kingdom . |
| 2042673 | 9/1980 | United Kingdom . |
| 1580438 | 12/1980 | United Kingdom . |
| 1340068 | 12/1993 | United Kingdom . |
| 2273755 | 6/1994 | United Kingdom . |
| 8908218 | 9/1989 | WIPO . |
| WO16320 | 8/1993 | WIPO . |

OTHER PUBLICATIONS

European Patent Application Pub # 0518521 A2, Endoh, Dec. 1992.
PCT WO 91/07619 Meijers et al. Nov. 1990.

(List continued on next page.)

*Primary Examiner*—Patrick Brinson
*Attorney, Agent, or Firm*—Zarley, McKee, Thomte, Voorhees & Sease

[57] ABSTRACT

An apparatus and method for repairing the junction of a sewer main line and a lateral pipe includes a generally T-shaped inflatable bladder having a main line portion and a lateral portion with resin absorbent liner wrapped around the main line portion and lateral portions of the bladder. The liner is impregnated with uncured resin, and the lateral bladder is then inverted within the main line bladder, thereby inverting the lateral liner along with the lateral bladder. The liner/bladder assembly is positioned within a main line pipe with the lateral bladder coaxially aligned with a lateral pipe, to repair the junction between the lateral pipe and the main line pipe. Fluid is then introduced within the main line and lateral bladders to extend the lateral bladder into the lateral pipe, and to radially expand both the main line and lateral bladders to force the liners into contact with the main line pipe and lateral pipe. Once the resin is cured, the bladders are deflated, the lateral bladder is inverted back into the main line bladder, and the bladders are then removed from the main line pipe.

31 Claims, 8 Drawing Sheets

U.S. PATENT DOCUMENTS

| | | | |
|---|---|---|---|
| 4,207,130 | 6/1980 | Barber | 156/244.13 |
| 4,284,507 | 8/1981 | Beane | 210/435 |
| 4,288,321 | 9/1981 | Beane | 210/170 |
| 4,322,232 | 3/1982 | Beane | 55/360 |
| 4,334,943 | 6/1982 | Zenbayashi et al. | 156/287 |
| 4,350,548 | 9/1982 | Zenbayashi et al. | 156/156 |
| 4,366,012 | 12/1982 | Wood | 156/93 |
| 4,427,480 | 1/1984 | Kamuro et al. | 156/287 |
| 4,439,469 | 3/1984 | Wood | 427/230 |
| 4,576,205 | 3/1986 | Morinaga et al. | 138/98 |
| 4,581,247 | 4/1986 | Wood | 427/508 |
| 4,600,615 | 7/1986 | Hyodo et al. | 138/125 |
| 4,680,066 | 7/1987 | Wood | 156/156 |
| 4,685,983 | 8/1987 | Long | 156/423 |
| 4,752,511 | 6/1988 | Driver | 138/97 X |
| 4,778,553 | 10/1988 | Wood | 156/287 |
| 4,836,715 | 6/1989 | Wood | 138/98 X |
| 4,867,921 | 9/1989 | Steketee, Jr. | 264/36 |
| 4,871,413 | 10/1989 | Hyodo et al. | 156/382 |
| 4,954,016 | 9/1990 | Storgard | 138/97 X |
| 4,985,196 | 1/1991 | LeDoux et al. | 264/516 |
| 4,991,006 | 2/1991 | Wood | 358/100 |
| 5,044,405 | 9/1991 | Driver et al. | 138/98 |
| 5,108,533 | 4/1992 | Long et al. | 156/423 |
| 5,280,811 | 1/1994 | Catallo et al. | 138/98 |
| 5,322,653 | 6/1994 | Muller | 138/98 |
| 5,329,063 | 7/1994 | Endoh . | |
| 5,340,160 | 8/1994 | Meijers et al. | 285/15 |
| 5,358,359 | 10/1994 | Long | 405/154 |
| 5,388,616 | 2/1995 | Muller et al. | 138/98 |
| 5,393,481 | 2/1995 | Wood | 264/516 |
| 5,439,033 | 8/1995 | Kamiyama et al. | 138/98 |
| 5,454,401 | 10/1995 | Kamiyama et al. | 138/98 |
| 5,501,248 | 3/1996 | Kiest | 156/287 |
| 5,566,719 | 10/1996 | Kamiyama et al. | 138/98 |
| 5,598,873 | 2/1997 | Kamiyama et al. | 138/98 |
| 5,624,629 | 4/1997 | Wood | 264/516 |
| 5,692,543 | 12/1997 | Wood | 138/98 |

OTHER PUBLICATIONS

PCT WO 91/16568 Wood Nov. 1991.

PCT WO 92/21909 Van Dijk Dec. 1992.

PCT WO 95/08737 Taylor May, 1994.

Insituform (1985) Illustrates installation of a sewer pipe liner by the inversion method using a seamed, resin–impregnated liner.

NuPipe (Civil Engineering Magazine 1993) explains the installation method of a softened PVC pipe liner.

Paltem Portable Water Hose Lining Method describes a pipe liner installation method using a guide belt (no date available).

Paltem Sewer Hose Lining Method describes a compressed air inversion method of pipe lining (no date available).

APPARATUS AND METHOD FOR REPAIRING THE JUNCTION OF A SEWER MAIN LINE AND LATERAL

CROSS-REFERENCE TO RELATED APPLICATION

This is a continuation-in-part application of application Ser. No. 08/622,817 filed Mar. 27, 1996, entitled APPARATUS FOR REPAIRING A PIPELINE AND METHOD FOR USING THE SAME, now U.S. Pat. No. 5,765,597, which is a continuation-in-part of Ser. No. 08/293,697, filed Aug. 19, 1994, which is now abandoned.

TECHNICAL FIELD

The present invention relates generally to resin impregnated liners for repair of pipelines, and more particularly to an improved method and apparatus for installing the liner at the juncture of a sewer main line and lateral.

BACKGROUND OF THE INVENTION

One method of repairing damaged sewer pipe is to excavate the area surrounding the sewer pipe and replace the broken portion. This is a very expensive and a labor intensive solution and is also an inconvenience to residents living in the area and utilizing roadways overlying the area.

Another solution is In situ relining of sewer pipes. In situ methods typically utilize a resin coated liner which is inserted into the existing sewer pipeline and unrolled against the sewer pipe. The unrolled liner is held against the existing sewer pipe while the resin cures to form a new pipe lining within the existing pipe.

One example of such a method is shown in U.S. Pat. No. 4,366,012. In this patent a process utilizing an elongated outer tube having an inner tube comprised of felt is shown. Uncured resin is introduced into the tube and is used to impregnate the felt inner tube. The two concentric tubes are then inverted into the end of the sewer pipe to be repaired and the inversion process continues until the area of the sewer pipe needing repair has been reached by the inverting tubes. Upon inversion the impregnated felt liner is placed on the outside of the original outer liner, and is pressed against the interior surface of the sewer pipe. When the resin cures a new pipe liner is provided at the area to be repaired by this process.

The applicant's co-pending patent application shows a method for impregnating a curable resin in a layer of resin absorbent material located within an elongated flexible bladder tube having a fill end and a vacuum end positioned down stream from the fill end. The bladder tube includes two walls forming a tube cavity therein. The layer of resin absorbent material has a down stream end positioned a predetermined distance from the vacuum end of the bladder tube, and an upstream end. An elongated gas conduit having first and second conduit ends is placed within the tube cavity with the first conduit end positioned up stream from the down stream of the resin absorbent material and with the second conduit end positioned down stream from the down stream end of the resin absorbent material.

A quantity of curable resin is then introduced into the fill end of the bladder tube, the quantity of resin being sufficient to impregnate all of the resin absorbent material within the bladder tube. A vacuum source is then connected to the bladder tube at a point spaced down stream from the down stream end of the resin absorbent material whereby the wall of the bladder tube will collapse on the layer of resin absorbent material and the gas conduit will provide a path for evaluating gas through the collapsed two walls. Gas is continuously evacuated from the bladder tube until the curable resin moves to the down stream end of the absorbent material and completely impregnates the absorbent material.

As described in detail in the co-pending '817 application, the repair sleeve is attached at its forward end to an inversion collar by means of stitches. The forward end of the inversion collar is then affixed to the forward end of the bladder tube by heat sealing, adhesive, or other suitable securement. In this way, as the bladder tube in inverted, the inversion collar will also be inverted so as to be positioned on the outside of the bladder after the inversion. Similarly, the stitches connecting the inversion collar to the repair sleeve will also cause the repair sleeve to invert, so as to be positioned on the outside of the bladder tube in contact with the portion of the pipeline to be repaired.

While the method and apparatus for repairing pipelines as described in the co-pending '817 application has served well for portions of continuous pipeline, the procedure and apparatus for repairing a junction of a lateral with a main line has been difficult, and has required access to the distal end of the lateral.

It has been discovered that access to main sewer lines for residential or other customers was frequently accomplished by forming a hole in the main line with a sledge or the like. The lateral was then simply abutted against the hole, and then the excavation backfilled to cover the juncture. Obviously, this juncture of the lateral with the main line would typically leak, and would not provide a tight sealed connection.

With the growing concern regarding the environmental impact of sewage leakage, such junctures are of primary concern for repair.

SUMMARY OF THE INVENTION

It is therefore a general object of the present invention to provide an improved method and apparatus for repairing the juncture of a main sewer line with a lateral.

Another object is to provide a method and apparatus for repairing the juncture of a lateral with a main line which may be accomplished solely from the sewer main line.

These and other objects of the present invention will be apparent to those skilled in the art.

The apparatus and method for repairing the junction of a sewer main line and a lateral pipe includes a generally T-shaped inflatable bladder having a main line portion and a lateral portion with resin absorbent liner wrapped around the main line portion and lateral portions of the bladder. The liner is impregnated with uncured resin, and the lateral bladder is then inverted within the main line bladder, thereby inverting the lateral liner along with the lateral bladder. The liner/bladder assembly is positioned within a main line pipe with the lateral bladder coaxially aligned with a lateral pipe, to repair the junction between the lateral pipe and the main line pipe. Fluid is then introduced within the main line and lateral bladders to extend the lateral bladder into the lateral pipe, and to radially expand both the main line and lateral bladders to force the liners into contact with the main line pipe and lateral pipe. Once the resin is cured, the bladders are deflated, the lateral bladder is inverted back into the main line bladder, and the bladders are then removed from the main line pipe.

DESCRIPTION OF THE PREFERRED EMBODIMENT

Figure 1:
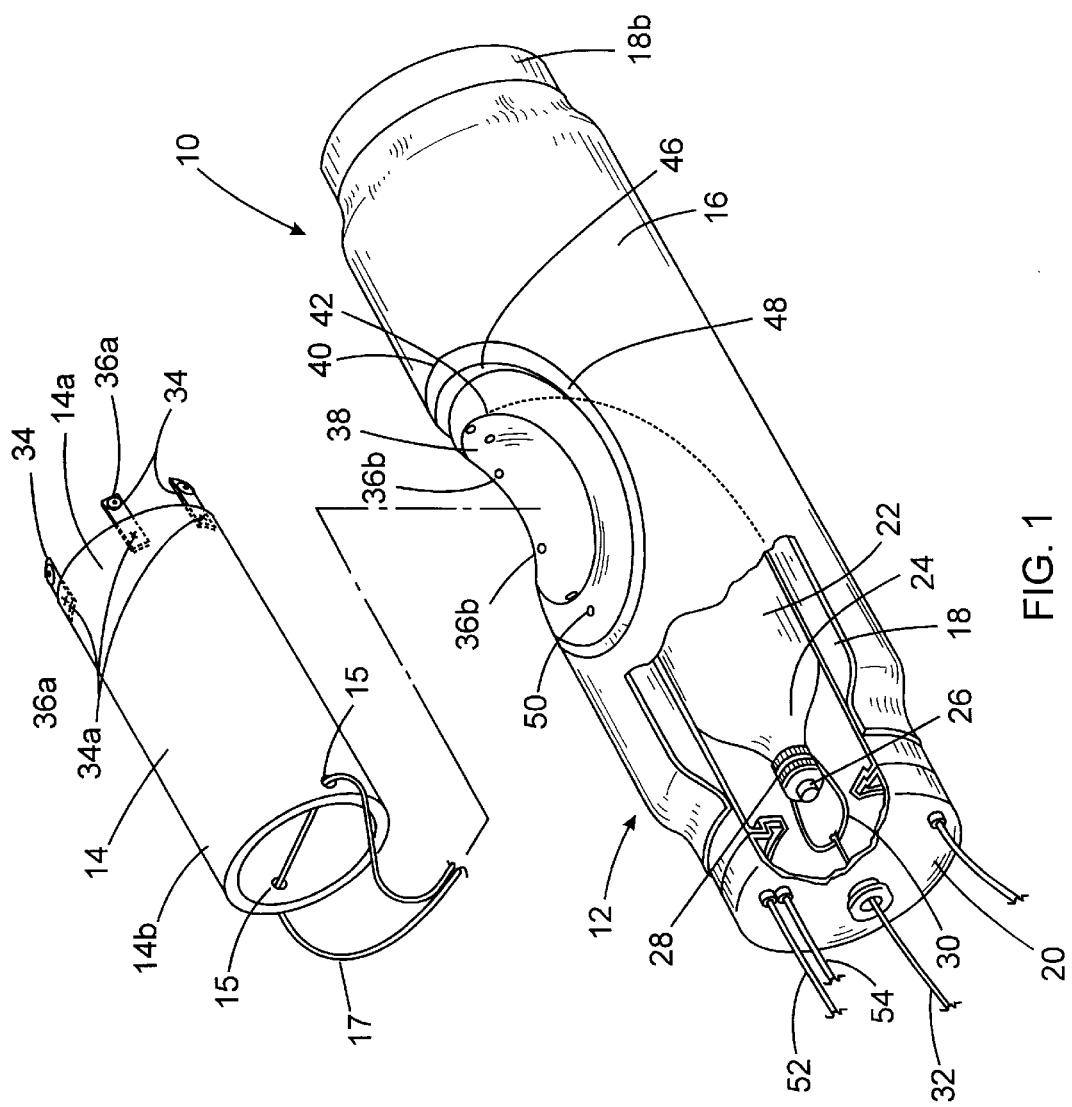
FIG. 1 is a perspective view of the liner/bladder assembly of the present invention with the liner exploded away from the bladder.

Referring now to the drawings, in which similar or corresponding parts are identified with the same reference numeral and more particularly to FIG. 1, the liner/bladder assembly of the present invention is designated generally at 10 which includes a generally T-shaped bladder tube 12 and a tubular liner 14 attached thereto, as described in more detail hereinbelow.

Figure 2:
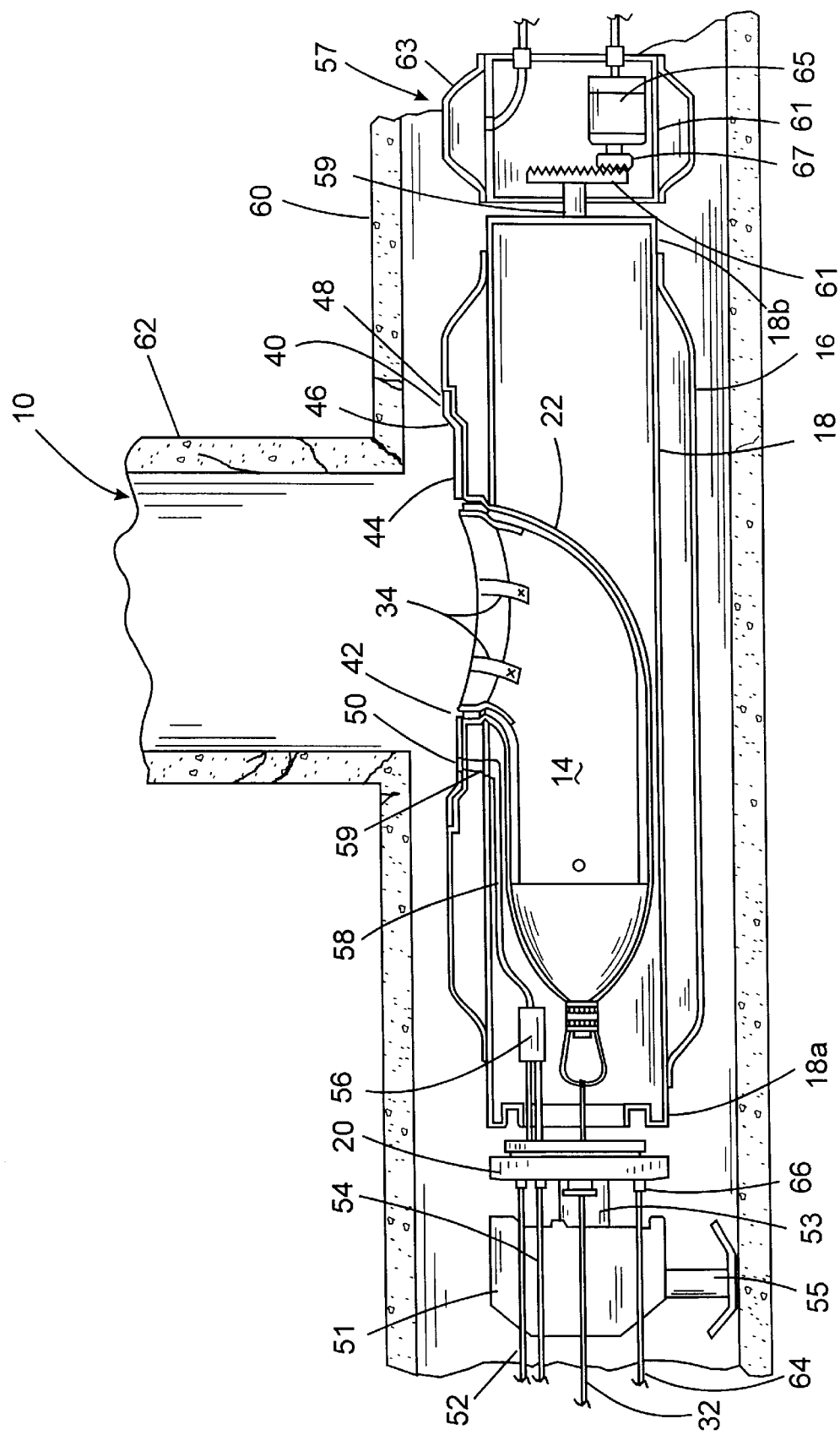
FIG. 2 is a sectional view through the liner/bladder assembly, showing the assembly positioned within a main pipeline.

T-shaped bladder tube 12 includes a generally cylinder tubular main line bladder 16 attached at opposing forward and rearward ends to the exterior surface of a steel pipe 18. Pipe 18 has a closed rearward end 18b, and an open forward end 18a with a cap 20 adapted for selective connection thereto with a twist-lock, or other fastener. The stem portion of the T-shaped bladder tube 12 is an elongated tubular lateral bladder 22, and projects generally centrally from main line bladder 16, to form a hollow T-shape. As shown in FIG. 2, the distal end 24 of lateral bladder 22 is inverted through a hole 18c in pipe 18 and into the interior of pipe 18. Fitted within the distal end 24 of lateral bladder 22 is a threaded receptacle 26 (see FIG. 1) which is held in place by means of clamps 28. A pulling loop 30 is also held by clamps 28 and is attached to control line 32.

Liner 14 is positioned within the inverted lateral bladder 22, as shown in FIG. 2, prior to installation. Liner 14 is a hollowed tubular member formed of felt or other resin absorbent material, and is impregnated with uncured resin prior to attachment to liner/bladder assembly 10. Liner 14 includes a first end 14a and a second end 14b, the first end thereof having a plurality of longitudinally extending attachment strips 34 frangibly connected thereto with stitches 34a, or the like. Attachment strips 34 have one-half 36a of a snap fastener thereon, which may be removably connected to the corresponding second half 36b of the fastener, the second half 36b being located spaced around the proximal end 38 of lateral bladder 22, adjacent the juncture of lateral bladder 22 with main line bladder 16.

The liner second end 14b has a pair of diametric apertures 15 therein, for receiving a string 17 therethrough. The ends of string 17 are drawn together and threaded through the inverted lateral bladder 22, out the distal end 24 thereof, and then through cap 20. String 17 is then pulled, so as to slide liner 14 within the inverted lateral bladder 22, until fastener first halves 36a on attachment strips 34 are aligned with fastener second halves 36b on the bladder 22. The fastener halves are then connected, and string 17 is removed by releasing one end and pulling it from apertures 15.

Main line bladder 16 has an annular metal plate 40 attached to the outer surface thereof, with the central aperture 42 of plate 40 corresponding to and of a size substantially the same as the diameter of lateral bladder 22. Thus, lateral bladder 22 will extend and expand through central aperture 42. Annular plate 40 includes an annular recessed plate 44 extending radially outwardly from central aperture 42. A shoulder 46 extends upwardly and outwardly from recessed plate 44, and an annular flange 48 extends radially outwardly from the upper edge of shoulder 46. Preferably, metal plate 40 is mounted to main line bladder 16 with flange 48 flush with the outer surface of main line bladder 16 as shown in FIG. 2. As shown in FIG. 1, a port 50 is formed through recessed plate 44, for a purpose to be described in more detail hereinbelow.

A pair of hoses 52 and 54 pass through ports in end cap 20 and are connected to a static mixer 56 within the interior of pipe 18. Hose 52 carries a resin identical to that used to impregnate the liner and hose 54 carries a catalyst for carrying and hardening the resin. A conduit 58 extends from the output side of mixer 56 through an aperture 59 in pipe 18 and then to port 50, to thereby selectively dispense the mix resin/catalyst onto recessed plate 44.

In operation, liner bladder assembly 10 is first produced, with main line bladder 16 having a diameter permitting easy passage through the main line sewer pipe 60 during the installation process, but which also permits expansion of the bladder to tightly fit within the diameter of main line sewer pipe 60 upon introduction of fluid pressure within main line bladder 16. Similarly, lateral bladder 22 has a diameter slightly less than the diameter of lateral pipe 62, but is formed of a flexible expandable material, such as rubber, which will permit lateral bladder 22 to expand to the interior diameter of lateral pipe 62.

The main line bladder 16 and lateral bladder 22 are manufactured as a single integral unit in a hollow tubular T-shape form (or in a Y-shape for a wye connection to the main line pipe), and the resin-impregnated liner 14 is then attached to the interior of the inverted lateral bladder 22 with snaps 36a connected to snap second halves 36b. As discussed in detail in the applicant's co-pending '817 application, liner 14 is impregnated with a resin material which will cure and harden prior to attachment to lateral bladder 22.

Liner/bladder assembly 10 is then inserted in main line sewer pipe 60 by pulling the liner bladder assembly through the sewer pipe until lateral bladder 22 is located in alignment with lateral pipe 62. Positioning of liner bladder assembly 10 is also detailed in the applicant's co-pending '817 application, and the contents of that application are incorporated herein by reference thereto.

FIG. 2 shows the preferred method of inserting the liner/bladder assembly 10 within sewer pipe 60. A hollow end cone 51 is rotatably attached to end cap 20 by a shaft 53, coaxial with pipe 18. Obviously, shaft 53 could also be a universal joint, to permit cone 51 to rotate and "bend" relative to pipe 18. A skid 55 on the cone 51 supports the pipe 18 and one end of liner/bladder assembly 10 above the bottom of sewer pipe 60.

The second end 18b of pipe 18 has a rotator unit 57 rotatably connected thereto by a universal joint 59. Rotator unit 57 includes a rigid tube 61 with an inflatable rubber sleeve 63 sealed at opposing ends to the exterior surface thereof. An air hose 65 is connected to a port in tube 61 to selectively inflate sleeve 63, to thereby raise the second end of pipe 18b above the bottom of the sewer pipe 60.

A gear 65 on universal joint 59 engages a drive gear 67 connected to a hydraulic motor 69. A hydraulic line 71 extends from motor 69 to selectively operate the motor 69 and thereby rotate gear 65, joint 59 and liner/bladder assembly 10 within pipe 60 until central aperture 42 of metal plate 40 is aligned with the longitudinal axis of lateral pipe 62. Air, or other fluid, is then introduced within the interior of main line bladder 16 outside pipe 18 via hose 64 connected to a port 66 in end cap 20 and thence through a hole 19 in pipe 18. This fluid pressure causes lateral liner 22 to revert through central aperture 42 into lateral pipe 62, with attachment strips 34 causing liner 14 to also revert to the outward surface of lateral bladder 22 in contact with the interior surface of lateral pipe 62.

Figure 3:
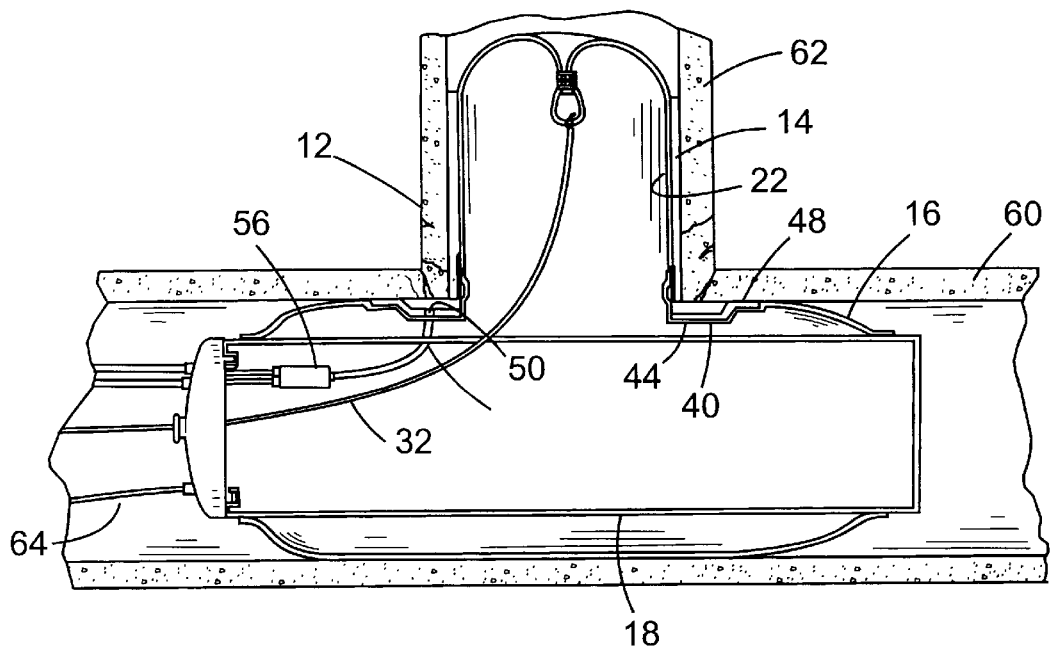
FIG. 3 is a sectional view similar to FIG. 2, but with the liner/bladder assembly expanded to install the liner.

As shown in FIG. 3, continued fluid pressure within main line bladder 16 and within lateral bladder 22 will cause the bladders to radially expand into firm contact around the entire inner surface of main line pipe 60 and lateral pipe 62. In this way, liner 14 will contact and line lateral pipe 62 from its juncture with main line pipe 60 for a distance as necessary to repair the pipe and junction. Once main line bladder 16 is fully inflated, it can be seen that flange 48 of metal plate 40 will be in contact with the interior surface of main line pipe 60, and that recessed plate 44 will thereby form an annular well adjacent the end of lateral pipe 62 and its juncture with main pipe 60.

Once T-shaped bladder tube 12 is fully inflated, resin is injected via static mixer 56 and port 50 into the well formed by recessed plate 44, and will migrate into fractures or open areas. This resin hardens and cures to form a seal between the lateral liner 14 and the main line pipe 60 at the juncture, with the resin impregnated liner 14 curing together with the resin injected on recessed plate 44 has a single integral piece. After the resin has cured and hardened, the fluid is evacuated from T-shaped bladder tube 12. Control line 32 is then pulled to peel away lateral bladder 22 from liner 14 and invert the lateral bladder 22 back into the interior of pipe 18. The frangible connection between liner 14 and lateral bladder 22 (stitches 34a) is disconnected to permit subsequent withdrawal of main line bladder 16 with lateral bladder 22 inverted therein.

Figure 8:
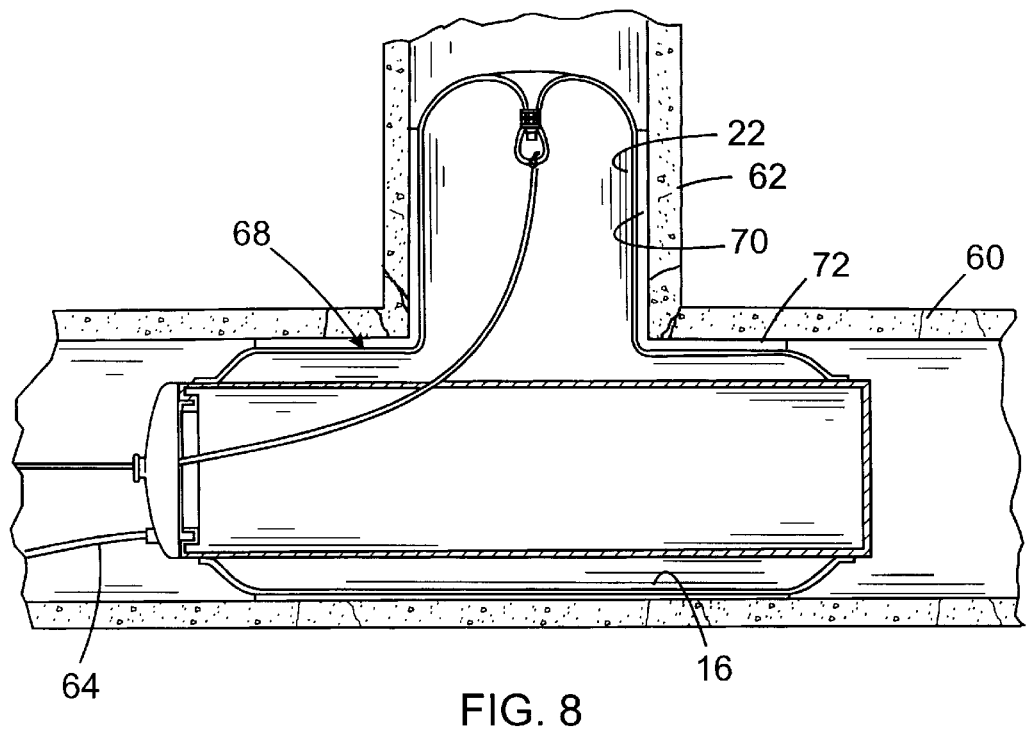
FIG. 8 is a sectional view similar to FIG. 7, showing the bladder assembly expanded to install the liner.

Referring now to FIGS. 4–8, a second embodiment of the invention utilizes a special liner 68 which is comprised of a tubular liner 70 for the lateral pipe 62 (hereinafter identified as lateral liner 70), attached to a flat sheet-like liner, identified as main line liner 72. Thus, liner 68 will contact and repair both lateral pipe 62 and a portion of the adjacent main pipe 60, as shown in FIG. 8.

Figure 4:
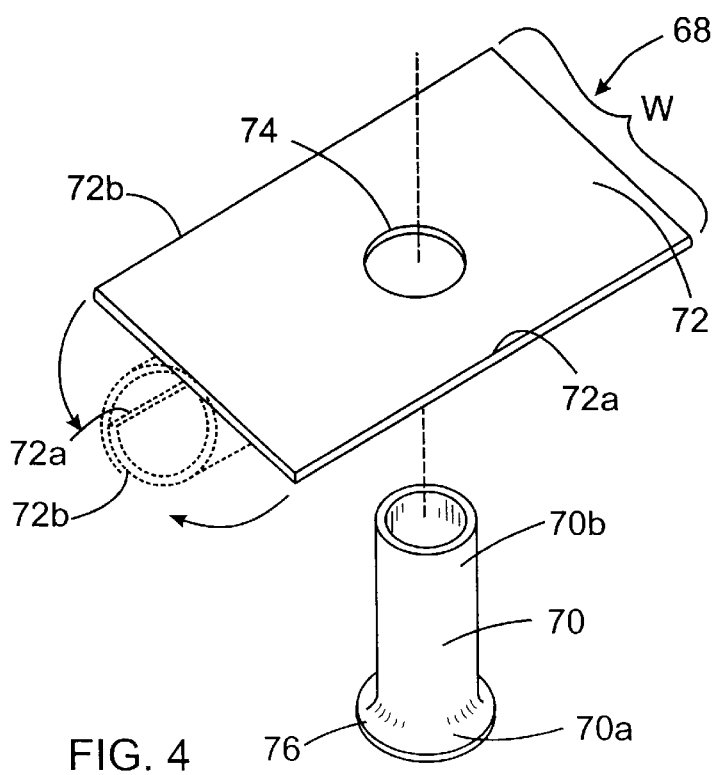
FIG. 4 is an exploded perspective view of a liner for use in a second embodiment of the invention.

Referring now to FIG. 4, liner 68 is manufactured with the main line portion 72 flat and generally rectangular with a width W greater than the interior circumference of main line pipe 60, such that the longitudinal edges 72a and 72b overlap one another when rolled into a cylindrical shape (shown in dashed lines in FIG. 4). Main line liner 72 has a hole 74 cut in the center, having a diameter matching the interior diameter of the lateral pipe 62.

Lateral liner 70 is manufactured into a tube having an outside diameter substantially equal to the inside diameter of lateral pipe 62. A lower end 70a of lateral liner 70 is placed over a mandrel. Approximately two inches of the lower end 70a extends over the mandrel, and a clamp is placed around the liner at the top of the mandrel. The two inch portion of the lower end 70a of liner 70 is then pulled outwardly to form a radially flaring portion 76.

The upper end 70b of lateral liner 70 is then journaled through hole 74 until flare 76 contacts main line liner 72. Flare 76 is connected to the flat main line liner 72 by sewing or fusing the flare to the flat sheet.

Figure 5:
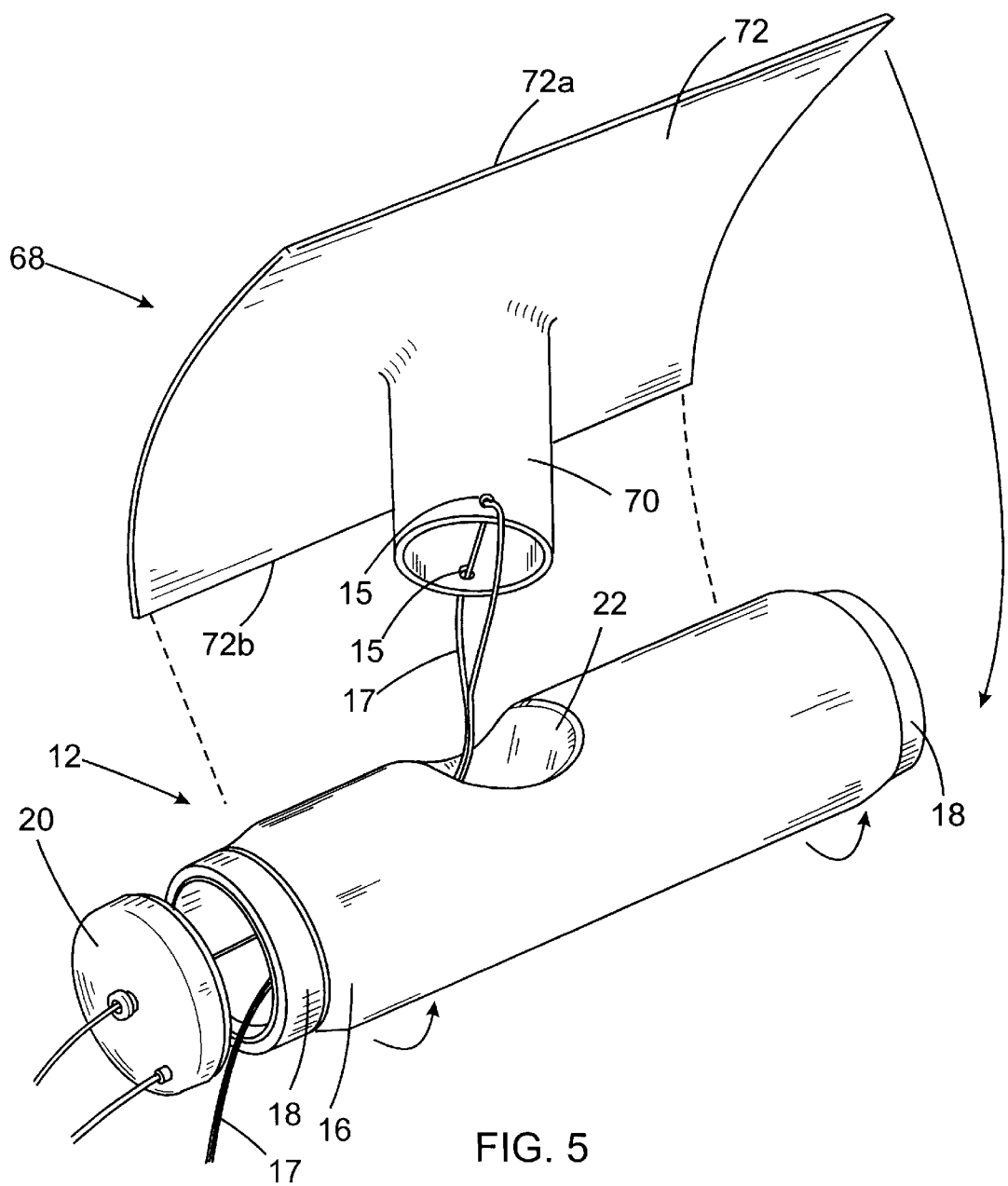
FIG. 5 is a perspective view of a liner/bladder assembly of a second embodiment of the invention, with the lateral liner of the assembly in a preinstallation position.
Figure 6:
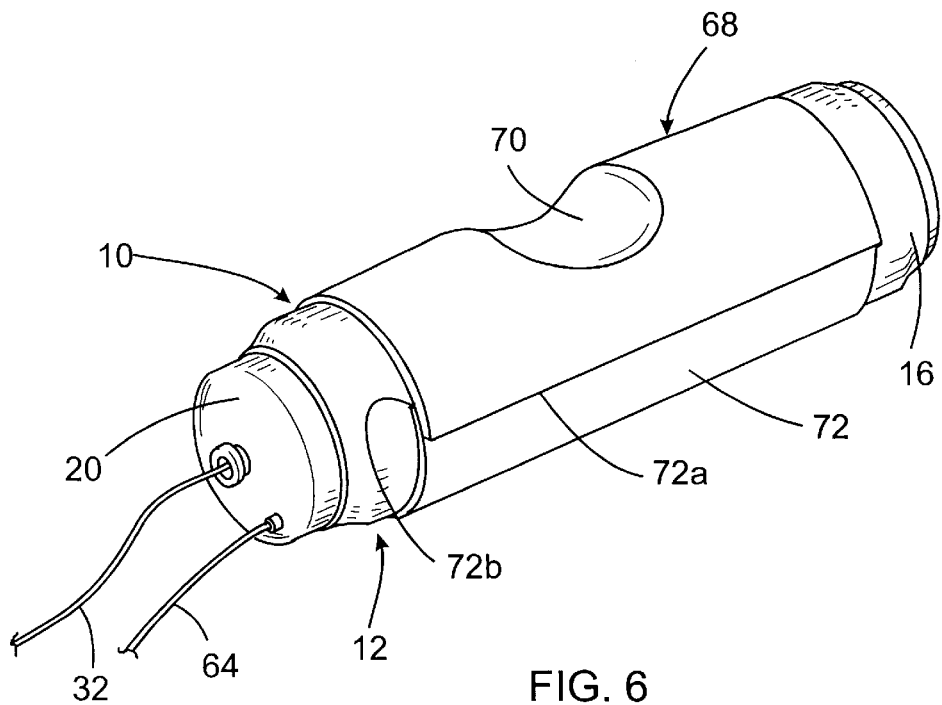
FIG. 6 is a view similar to FIG. 5, but with the lateral liner moved to the installation position.
Figure 7:
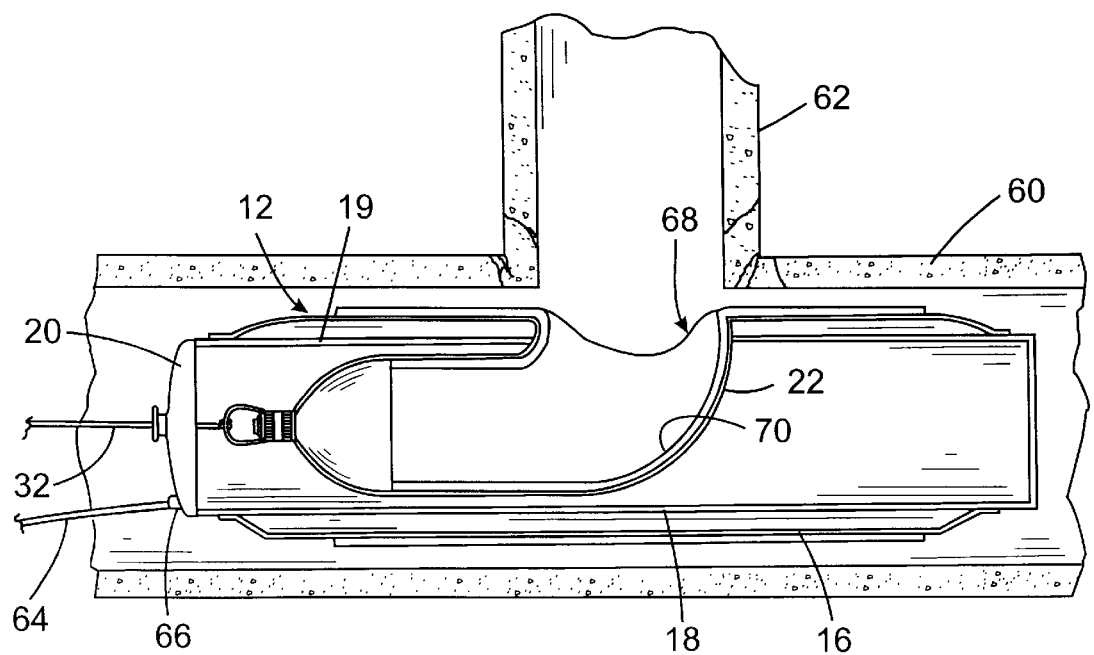
FIG. 7 is a sectional view through the liner/bladder assembly shown in FIGS. 5 and 6, positioned within a main sewer pipeline prior to installation of the lateral portion of the assembly.

Referring now to FIG. 5, the T-shaped bladder tube 12 of the first embodiment of the invention is again utilized with this second embodiment of the invention. Thus, main line bladder 16 has a lateral bladder 22 projecting outwardly therefrom to form a general T-shape, which is inverted into pipe 18. Liner 68 is then impregnated with resin positioned adjacent the T-shaped bladder 12, as shown in FIG. 5. String 17 is threaded through apertures 15 in the end of lateral liner 70, and out through the inverted lateral bladder 22 and then out the open end of pipe 18. String 17 is pulled, to draw lateral liner 70 within the inverted lateral bladder 22, and bring main line liner 72 into contact with main line bladder 16. The edges 72a and 72b of main line liner 72 are wrapped around main line bladder 16, until they overlap, as shown in FIG. 6. String 17 is then removed, the receptacle (not shown in FIG. 6) is attached to lateral bladder 22, and end cap 20 is mounted on pipe 18.

To install liner 68, liner/bladder assembly 10' is towed through main pipe line 60 to the point of repair, and rotated to align lateral bladder 22 and lateral liner 70 with lateral pipe 62, as described in more detail hereinabove. Fluid is then input into main line bladder 16, via hose 64, port 66 and hole 19. This fluid pressure will cause the main line bladder to inflate and expand in radius, while simultaneously the lateral bladder/liner will invert up within lateral pipe 62. Main line liner 72 will become partially unwrapped during expansion, but has a width to maintain continuous contact around the entirety of the interior surface of main line pipe 60, with overlap of the longitudinal edges. Both the lateral liner 70 and main line liner 72 will thereby be pressed tightly against the interior walls of lateral pipe 62 and main line pipe 60, as shown in FIG. 8.

Once the resin in liner 68 has cured and hardened, the fluid is evacuated by drawing a vacuum through hose 64. This will cause lateral bladder 22 to reinvert back into the pipe 18, and main line bladder 16 may then be removed from main line pipe 60.

Figure 9:
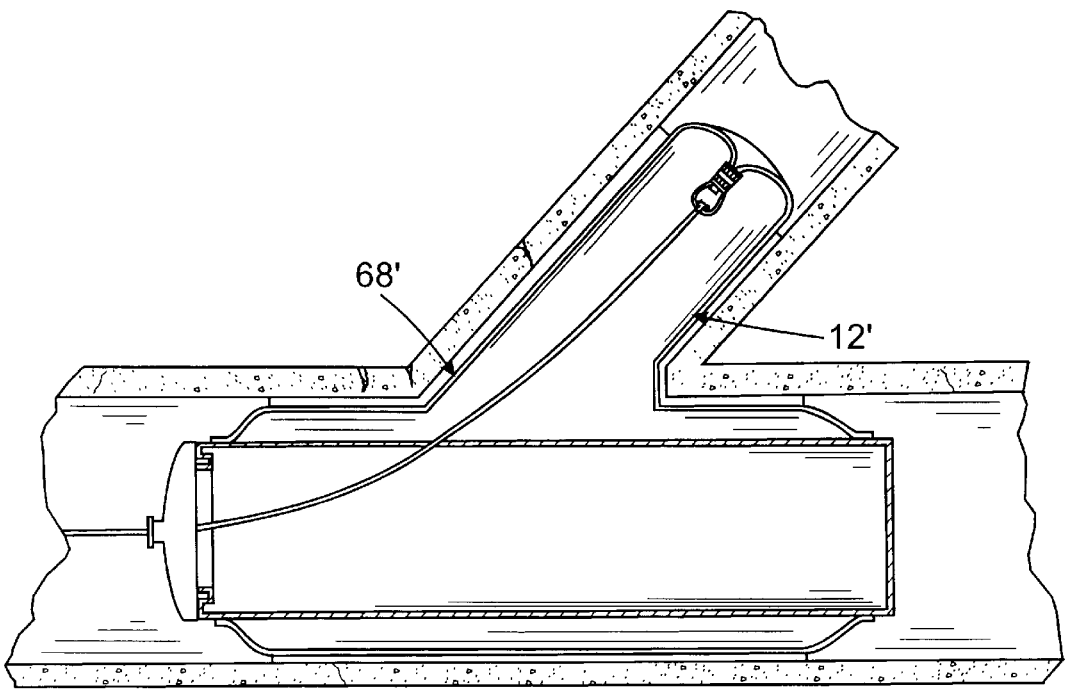
FIG. 9 is a view similar to FIG. 8, showing a modified version of the second embodiment of the invention installed in a WYE juncture of a lateral with a main pipeline.

As shown in FIG. 9, liner 68' and T-shaped bladder 12' may be modified and molded in the shape of a wye, using the same process.

Figure 10:
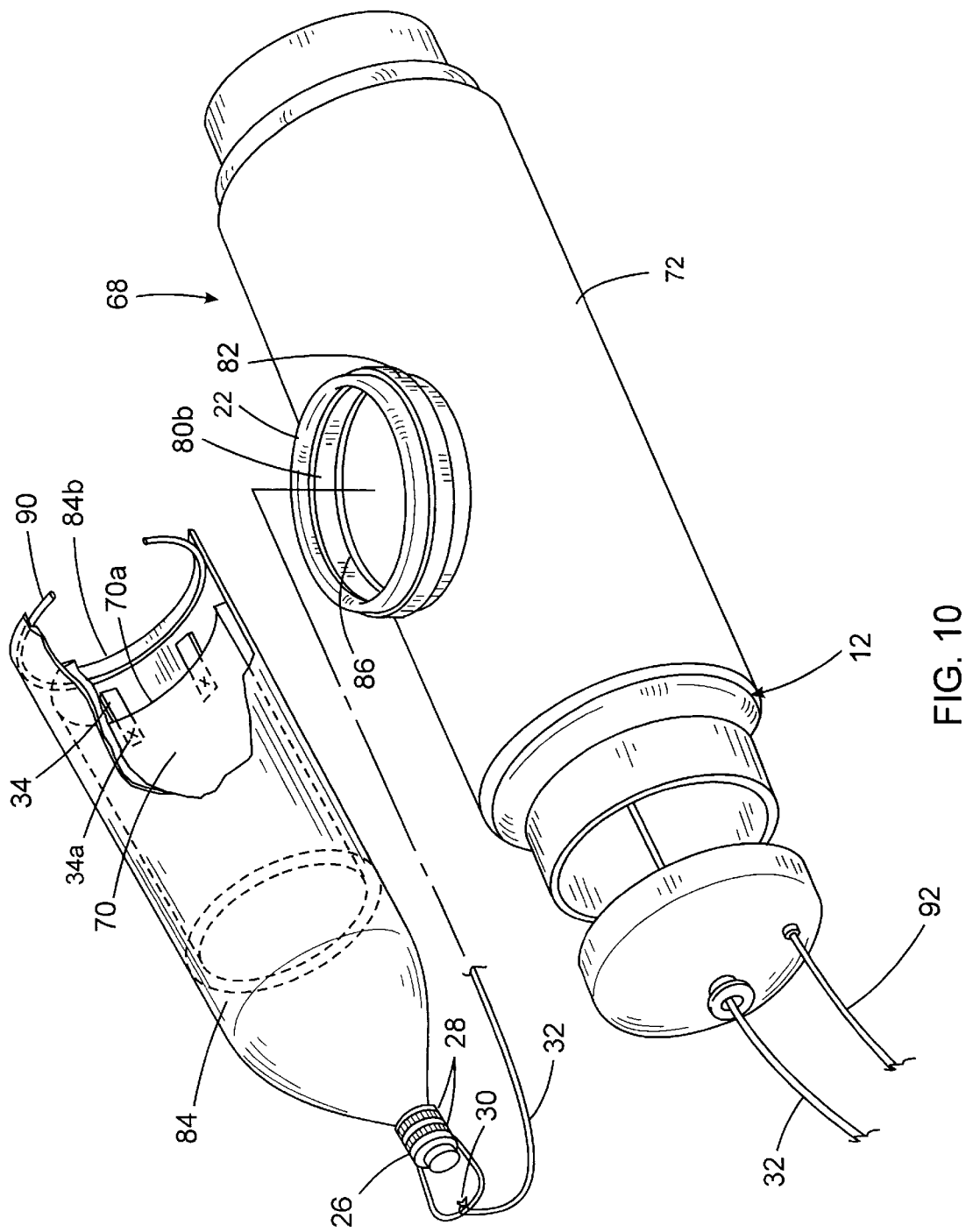
FIG. 10 is an exploded perspective view of a third embodiment of the liner/bladder assembly.
Figure 11:
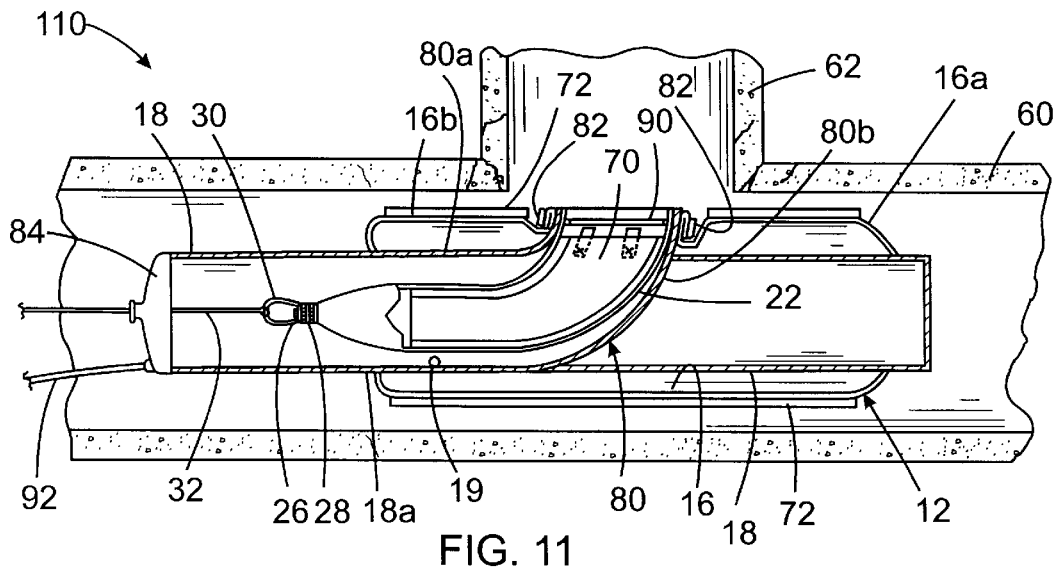
FIG. 11 is a sectional view through the liner/bladder assembly shown in FIG. 10, positioned within a main sewer pipeline prior to installation of the lateral portion of the assembly.
Figure 12:
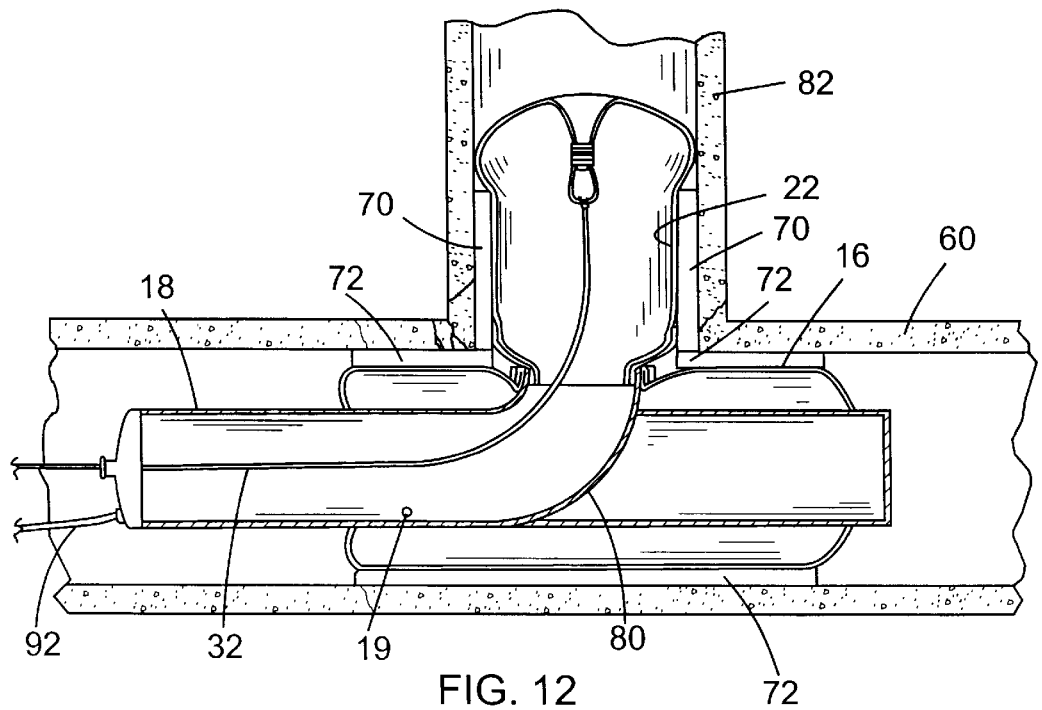
FIG. 12 is a sectional view similar to FIG. 11, showing the bladder assembly expanded to install the liner.

Referring now to FIGS. 10–12, a third embodiment of the invention is designated generally at 110 and utilizes the lateral liner 70 and main liner 27 of the previous embodiment, but the liners 70 and 72 are left unattached.

Referring now to FIG. 11, pipe 18 includes a rigid elbow 80 formed therein with the first end 18a of pipe 18 forming the first end 80a of elbow 80. The second end 80b of elbow 80 projects outwardly from pipe 18, with an axis coaxial with lateral pipe 62. In FIGS. 11 and 12, lateral pipe 62 is shown at a 90° angle relative to main line pipe 60, and thus elbow 80 is a 90° elbow. However, this same device could be utilized on a wye, having any desired angle.

As with the previous embodiments, main line bladder 16 is sealed at both ends to pipe 18. However, the lateral bladder 22 is shortened to a stub and folded over, and then banded to the outside of the projecting end 80*b* of elbow 80 with a band 82. In this way, fluid flows into main line bladder 16 through hole 19, and will expand main line bladder 16 because of the seal at elbow end 80*b*, as shown in FIG. 10.

An auxiliary tubular bladder 84 is provided with the same receptacle 26, clamps 28, pulling loop 30 and control line 32 as were used in the previous embodiments. The lateral liner 70 is positioned within auxiliary bladder 84 with a first end 70*a* spaced from, but proximal to the rearward edge 84*b* of bladder 84. A plurality of attachment strips 34 are frangibly connected with stitches 34*a*, or the like, to the liner first end 70*a*, and affixed to the interior surface of the bladder rearward end 84*b*.

The main line liner 72 consists of a flat sheet with an aperture centered therein to surround the projecting end 80*b* of elbow 80. Main line liner 72 is impregnated with resin and then wrapped around main line bladder 16, with the ends overlapping.

Once lateral liner 70 is impregnated with resin, while positioned within auxiliary bladder 84, the control line 32 is pulled, to pull auxiliary bladder 84 down through elbow 80 into pipe 18. Auxiliary bladder 84 is positioned with its rearward end 84*b* proximal the edge of elbow second end 80*b*. As shown in FIG. 10, a groove 86 is formed around the interior circumference of elbow second end 84*b*. A press seal is formed between auxiliary bladder rearward end 84*b* and elbow second end 80*b*, by pressing an annular band 90, against bladder 84 and into groove 86. The press seal formed by band 90 will permit fluid forced into elbow 80 to extend and expand auxiliary liner 84, thereby reverting lateral liner 70 to the exterior of auxiliary liner 84 and into contact with the interior surface of lateral pipe 62, as shown in FIG. 12.

During the inflation process, main line liner 72 will become partially unwrapped during expansion, but has a width to maintain continuous contact around the entirety of the interior surface of the main line pipe 60, with overlap of the longitudinal edges. Both the lateral liner 70 and main line liner 72 will thereby be pressed tightly against the interior walls of lateral pipe 62 and main line pipe 60 as shown in FIG. 12.

Once the resin in liner 68 has cured and hardened, liners 70 and 72 will seal together as one piece. The fluid is evacuated by drawing a vacuum through conduit 92. Control line 32 is pulled once again to invert auxiliary bladder 84 back through elbow 80 and into pipe 18. The frangible connection of the stitches on attachment strips 34 are broken to permit bladder 84 to be fully inverted into pipe 18. The vacuum will then cause main line bladder 16 to contract in radius, to permit removal from main line pipe 60.

Whereas the invention has been shown and described in connection with the preferred embodiment thereof, many modifications, substitutions and additions may be made which are within the intended broad scope of the appended claims.

I claim:

1. Apparatus for repairing the junction of a sewer main line and a lateral connected thereto, comprising:

an elongated tubular lateral bladder having first and second ends and an outer cylindrical surface, the first end being closed and the second end being fluidly connected to a main line bladder;

said main line bladder being formed of an elongated tubular bladder having closed first and second ends and an outer cylindrical surface, the lateral bladder being connected to the main line bladder between the first and second ends of the main line bladder, said main line bladder being expandable between a deflated condition and an inflated condition with a greater diameter and circumference in the inflated condition;

said lateral bladder being operable between an inverted position within the main line bladder, and an expanded position forming a general T-shape with the main line bladder;

an elongated tubular lateral liner of resin-absorbent material wrapped around the outer surface of the lateral bladder, said lateral liner having first and second ends and an interior cylindrical surface;

a plurality of spaced apart, generally parallel attachment strips attached at first ends to the outer surface of the lateral bladder proximal the second end, and frangibly attached at second ends to the interior surface of the liner proximal the second end, to cause the liner to invert outwardly onto the outer surface of the lateral bladder when the lateral bladder is expanded from the inverted condition to the inflated condition;

an annular plate mounted to the outer surface of the main line bladder and encircling the lateral bladder;

said plate having an annular recessed portion adjacent and encircling the lateral bladder, a shoulder extending radially outwardly and upwardly from the recessed portion, and a flange extending radially outwardly from the shoulder; and means for introducing uncured resin material onto the recessed portion between the shoulder and lateral bladder and liner.

2. The apparatus of claim 1, further comprising means for introducing fluid pressure into the main line bladder, for causing the lateral bladder to inflate and extend upwardly out of the main line bladder, and for causing both the main line and lateral bladders to inflate radially outwardly.

3. The apparatus of claim 1, further comprising means connected to the closed end of the lateral bladder for selectively inverting the lateral bladder.

4. The apparatus of claim 1, wherein the means for introducing uncured resin material includes a conduit connected at one end to a port formed in the plate recessed portion, and extending through the main line bladder to a port in the main line bladder first end.

5. The apparatus of claim 1, wherein the lateral bladder is connected to the main line bladder at a non-orthogonal angle, and wherein the lateral liner is connected to the sheet at the same non-orthogonal angle.

6. The apparatus of claim 1, wherein said attachment strips are elongated strips and are uniformly spaced around the outer surface of the lateral bladder and interior surface of the lateral liner.

7. The apparatus of claim 1, wherein the frangible connection of each attachment strip to the lateral bladder includes one half of a cooperable fastener on the bladder and a second half of the cooperable fastener on the liner.

8. The apparatus of claim 7, wherein the cooperable fastener is a snap.

9. The apparatus of claim 1, further comprising:

an elongated pipe having a closed end, an open end, and an opening formed intermediate the ends;

said main line bladder sealed at its ends to an outside surface of the pipe with the lateral bladder operable to invert through the pipe opening;

said pipe having an aperture therein for communicating fluid to the main line bladder from the interior of the pipe.

10. A method for forming a liner/bladder assembly for repairing the junction of a main line pipe with a lateral pipe, comprising the steps of:

provide an elongated tubular lateral bladder having a closed first end and a second end fluidly connected to a main line tubular bladder to form a generally T-shaped bladder, the main line bladder having closed first and second ends;

attaching an annular plate to the main line bladder, surrounding the lateral bladder second end, the plate having an annular recessed portion adjacent and encircling the lateral bladder, a shoulder extending radially outwardly and upwardly from the recessed portion, and a flange extending radially outwardly from the shoulder;

pulling the first end of the lateral bladder into the main line bladder to invert the lateral bladder;

connecting first ends of a plurality of spaced apart, generally parallel attachment strips to the lateral bladder second end;

frangibly attaching second ends of the attachment strips to an interior surface of an elongated tubular lateral liner, proximal the second end of the liner; and pulling the first end of the liner into the inverted lateral bladder.

11. The method of claim 10, further comprising the step of connecting a conduit for carrying uncured resin between a port formed in the plate recessed portion and a port formed in the main line bladder first end.

12. A method for repairing the junction of a main line pipe with a lateral pipe, comprising the steps of:

providing a liner/bladder assembly including an elongated tubular lateral bladder and main line bladder, the lateral bladder having a closed first end and a second end fluidly connected to the main line tubular bladder to form a generally T-shaped bladder, the main line bladder having closed first and second ends, and an annular plate attached to the main line bladder, surrounding the lateral bladder second end, the plate having an annular recessed portion adjacent and encircling the lateral bladder, a shoulder extending radially outwardly and upwardly from the recessed portion, and a flange extending radially outwardly from the shoulder;

pulling the first end of the lateral bladder into the main line bladder to invert the lateral bladder;

connecting first ends of a plurality of spaced apart, generally parallel attachment strips to the lateral bladder second end;

frangibly attaching second ends of the attachment strips to an interior surface of an elongated tubular lateral liner, proximal the second end of the liner;

pulling the first end of the liner into the inverted lateral bladder;

impregnating the lateral liner with resin;

positioning the liner/bladder assembly within a main line pipe with the main line bladder generally coaxial with the main line pipe and the second end of the lateral bladder aligned with a lateral pipe;

inflating the main line bladder and lateral bladder until the lateral bladder extends into the lateral pipe and expands radially within the lateral pipe to force the lateral liner into contact with the interior surface of the lateral pipe, and until the main line bladder expands radially into contact with the interior surface of the main line pipe;

introducing uncured resin material into the space formed between the recessed portion of the plate and the main line pipe interior surface;

maintaining pressure within the main line and lateral bladders until the resin has cured and hardened;

deflating the main line and lateral bladders;

inverting the lateral bladder into the main line bladder; and breaking the frangible connection of the attachment strips with the lateral liner and removing the main line and lateral bladders from the main line pipe.

13. Apparatus for repairing the junction of a sewer main line and a lateral connected thereto, comprising:

an elongated tubular lateral bladder having first and second ends, the first end being closed and the second end being fluidly connected to a main line bladder;

said main line bladder being formed of an elongated tubular bladder having closed first and second ends, the lateral bladder being connected to the main line bladder between the first and second ends of the main line bladder, said main line bladder being expandable between a deflated condition and an inflated condition with a greater diameter and circumference in the inflated condition;

said lateral bladder being operable between an inverted position within the main line bladder, and an expanded position forming a general T-shape with the main line bladder;

an elongated tubular lateral liner of resin-absorbent material wrapped around an exterior surface of the lateral bladder, having first and second ends;

a main line liner formed of a flat sheet of resin-absorbent material and wrapped around the circumference of the main line bladder, the sheet having an opening therein juxtaposed around the connection of the lateral and main line bladders and connected to the second end of the lateral liner; and said lateral liner being operable between a first position journaled within the inverted lateral bladder, and a second position wrapped around the inflated lateral bladder.

14. The apparatus of claim 13, further comprising means for introducing fluid pressure into the main line bladder, for causing the lateral bladder to inflate and extend upwardly out of the main line bladder, and for causing both the main line and lateral bladders to inflate radially outwardly.

15. The apparatus of claim 13, further comprising means connected to the closed end of the lateral bladder for selectively inverting the lateral bladder.

16. The apparatus of claim 13, wherein said sheet has a length extending along the longitudinal axis of the main line bladder, and a width extending around the circumference of the main line bladder, the sheet width being greater than the circumference of the inflated main line bladder such that side edges of the sheet overlap.

17. The apparatus of claim 15, wherein the means for selectively inverting the lateral bladder includes a cord extending from the lateral bladder closed end, through the main line bladder and out through a port in the first end of the main line bladder.

18. The apparatus of claim 13, wherein the lateral bladder is connected to the main line bladder at a non-orthogonal angle, and wherein the lateral liner is connected to the sheet at the same non-orthogonal angle.

19. The apparatus of claim 13, further comprising:

an elongated pipe having a closed end, an open end, and an opening formed intermediate the ends;

said main line bladder sealed at its ends to an outside surface of the pipe with the lateral bladder operable to invert through the pipe opening into the pipe;

said pipe having an aperture therein for communicating fluid to the main line bladder from the interior of the pipe.

20. A method for forming a liner/bladder assembly for repairing the junction of a main line pipe with a lateral pipe, comprising the steps of:

providing an elongated tubular lateral bladder having a closed first end and a second end fluidly connected to a main line tubular bladder to form a generally T-shaped bladder, the main line bladder having closed first and second ends;

pulling the lateral bladder first end into the main line bladder to invert the lateral bladder; and wrapping a resin-absorbent liner around the outer surface of the main line bladder, the liner including a flat sheet liner wrapped around the main line bladder with side edges overlapping one another to form a cylindrical shape, and a tubular lateral liner journaled within the inverted lateral bladder and projecting from the main line liner.

21. The method of claim 20, further comprising the step of forming the liner, prior to wrapping the bladder, the forming step including the steps of:

forming a cylindrical lateral liner, having first and second ends;

cutting an aperture centrally in a flat sheet of liner material to form the main line liner; and connecting the second end of the lateral liner to the sheet, around the aperture on the sheet.

22. The method of claim 21, wherein the steps of forming the liner further include the steps of:

flaring the second end of the lateral liner radially outwardly; and inserting the first end of the lateral liner through the sheet aperture until the flared end contacts the sheet, prior to the connecting step.

23. A method for repairing the junction of a main line pipe with a lateral pipe, comprising the steps of:

providing an elongated tubular lateral bladder having a closed first end and a second end fluidly connected to a main line tubular bladder to form a generally T-shaped bladder, the main line bladder having closed first and second ends;

inverting the closed end of the lateral bladder and pulling it into the main line bladder;

impregnating a resin absorbent liner with uncured resin material capable of curing and hardening, the liner including a tubular lateral liner projecting centrally from a flat sheet main line liner;

journaling the lateral liner within the inverted lateral bladder;

wrapping the main line liner around the outer surface of the main line bladder with side edges overlapping one another to form a cylindrical shape;

said bladders and liners together forming a liner/bladder assembly;

positioning the liner/bladder assembly within a main line pipe with the main line bladder generally coaxial with the main line pipe and the second end of the lateral bladder aligned with a lateral pipe;

inflating the main line bladder and lateral bladder until the lateral bladder extends into the lateral pipe and expands radially within the lateral pipe to force the lateral liner into contact with the interior surface of the lateral pipe, and until the main line bladder expands radially to force the main line liner into contact with the interior surface of the main line pipe;

maintaining pressure within the main line and lateral bladders until the resin has cured and hardened;

deflating the main line and lateral bladders;

inverting the lateral bladder into the main line bladder; and removing the main line and lateral bladders from the main line pipe.

24. Apparatus for repairing the junction of a sewer main line and a lateral connected thereto, comprising:

an elongated pipe having an open first end, a closed second end, and a longitudinal axis generally coaxial with the main line pipe;

a rigid tubular elbow formed in the pipe with the pipe first end forming a first end of the elbow, the elbow having an open second end projecting outwardly from the pipe along an axis generally coaxial to the lateral;

an elongated tubular main line bladder having first and second ends sealed to an exterior surface of the pipe, said main line bladder being expandable between a deflated condition and an inflated condition with a greater diameter and circumference in the inflated condition;

said main line bladder having an opening formed therein intermediate the ends and sealed around the exterior of the elbow second end;

an elongated tubular auxiliary bladder having first and second ends, sealed at the second end to an interior surface of the elbow second end, said auxiliary bladder being formed of a material expandable in a radial direction;

means on the first end of the auxiliary bladder for selectively closing the bladder first end;

said lateral bladder being operable between an inverted position extending through the elbow second end and out the elbow first end into the pipe, and an inflated position extending outwardly from the elbow second end;

an elongated tubular lateral liner of resin-absorbent material inserted within the lateral bladder and having first and second ends, the second end of the lateral liner being frangibly connected to the auxiliary bladder proximal the bladder second end;

a main line liner formed of a flat sheet of resin-absorbent material and wrapped around the circumference of the main line bladder, the sheet having an opening therein juxtaposed around the elbow second end;

said lateral liner being operable between a first position within the lateral bladder, and an inverted position wrapped around the inflated lateral bladder; and means connected to the first end of the pipe for selectively closing the pipe first end.

25. The apparatus of claim 24, further comprising means for introducing fluid pressure into the auxiliary bladder and into the main line bladder, for causing the auxiliary bladder to inflate and extend upwardly out of the elbow, and for causing both the main line and auxiliary bladders to inflate radially outwardly.

26. The apparatus of claim 25, wherein said means for inflating the main line bladder includes an aperture formed in the pipe permitting fluid to flow from the interior thereof outwardly into the main line bladder.

27. The apparatus of claim 24, wherein said sheet has a length extending along the longitudinal axis of the main line bladder, and a width extending around the circumference of the main line bladder, the sheet width being greater than the circumference of the inflated main line bladder such that side edges of the sheet overlap.

28. A method for forming a liner/bladder assembly for repairing the junction of a main line pipe with a lateral pipe, comprising the steps of:

attaching opposing ends of an elongated tubular main line bladder to the outer surface of an elongated pipe, the pipe having a tubular elbow formed therein, the pipe first end forming a first end of the elbow and the elbow having a second end projecting outwardly from the pipe with an opening in the main line bladder sealed around the exterior surface of the elbow second end;

inserting a tubular lateral liner into a tubular auxiliary bladder, the liner and bladder each having first and second ends, and frangibly attaching the liner second end to the bladder second end;

impregnating the lateral liner with resin;

pulling the auxiliary bladder and resin-impregnated lateral liner through the elbow second end and into the interior of the pipe, with the auxiliary bladder second end proximal the elbow second end;

sealing the auxiliary bladder second end to the interior surface of the elbow second end; and wrapping a flat sheet resin-absorbent main line liner around the outer surface of the main line bladder with side edges overlapping one another to form a cylindrical shape.

29. The method of claim 28, further comprising the steps of:

providing the elbow with an aperture, to permit fluid flow from the interior of the elbow to the interior of the main line bladder.

30. A method for repairing the junction of a main line pipe with a lateral pipe, comprising the steps of:

providing an elongated pipe having:

an open first end, a closed second end, and a longitudinal axis generally coaxial with the main line pipe;

a rigid tubular elbow formed in the pipe with the pipe first end forming a first end of the elbow, the elbow having an open second end projecting outwardly from the pipe along an axis generally coaxial to the lateral;

an elongated tubular main line bladder having first and second ends sealed to an exterior surface of the pipe, said main line bladder being expandable between a deflated condition and an inflated condition with a greater diameter and circumference in the inflated condition; and said main line bladder having an opening formed therein intermediate the ends and sealed around the exterior of the elbow second end;

inserting a tubular lateral liner into a tubular auxiliary bladder, the liner and bladder each having first and second ends, and frangibly attaching the liner second end to the bladder second end;

impregnating the lateral liner with resin;

pulling the auxiliary bladder and resin-impregnated lateral liner through the elbow second end and into the interior of the pipe, with the auxiliary bladder second end proximal the elbow second end;

sealing the auxiliary bladder second end to the interior surface of the elbow second end;

wrapping a resin-impregnated liner around the outer surface of the main line bladder with side edges overlapping one another to form a cylindrical shape, said bladders and liners forming a liner/bladder assembly;

positioning the liner/bladder assembly within a main line pipe with the main line bladder generally coaxial with the main line pipe and the second end of the elbow aligned with a lateral pipe;

inflating the auxiliary bladder until the auxiliary bladder extends into the lateral pipe and expands radially within the lateral pipe to force the lateral liner into contact with the interior surface of the lateral pipe;

inflating the main line bladder until the main line bladder expands radially to force the main line liner into contact with the interior surface of the main line pipe and an edge of the lateral liner;

maintaining pressure within the main line and lateral bladders until the resin has cured and hardened;

deflating the main line and auxiliary bladders;

inverting the auxiliary bladder into the elbow; and removing the main line and auxiliary bladders from the main line pipe.

31. The method of claim 30, wherein the elbow includes an aperture therein permitting fluid flow into the main line bladder from the interior of the elbow, and wherein the steps of inflating the bladders are accomplished simultaneously.

* * * * *